Jan. 3, 1967    B. F. BACHUS    3,295,163
STRAND COOLING APPARATUS
Filed April 28, 1964    2 Sheets-Sheet 2
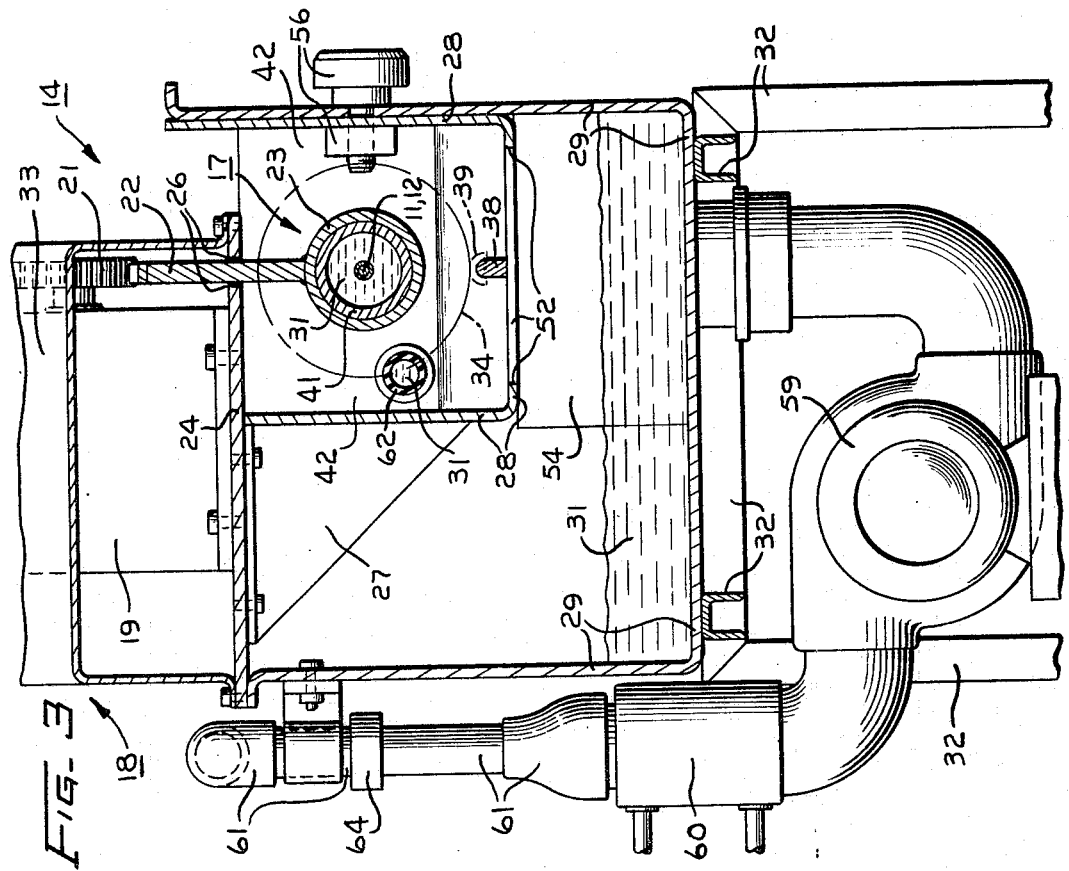
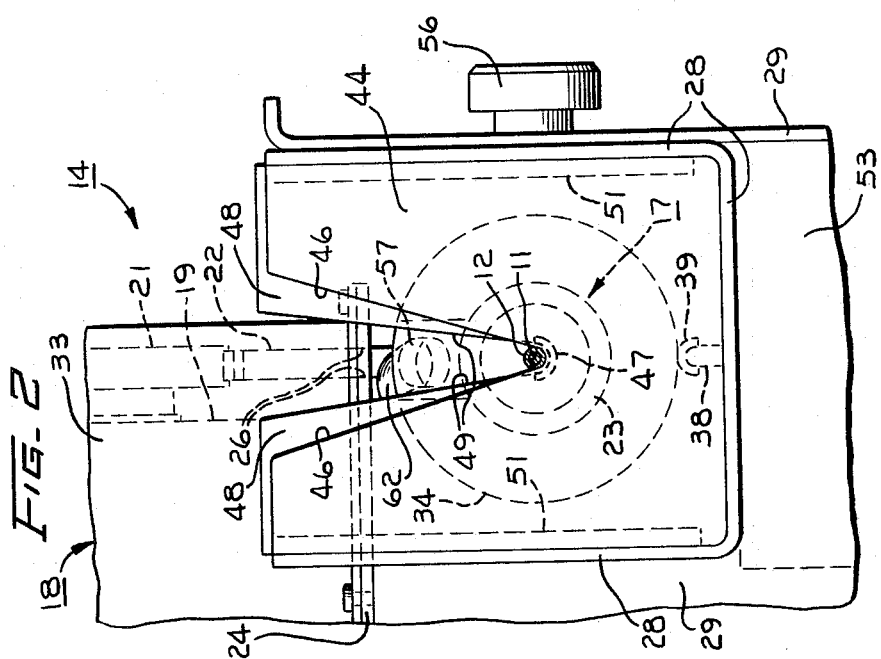

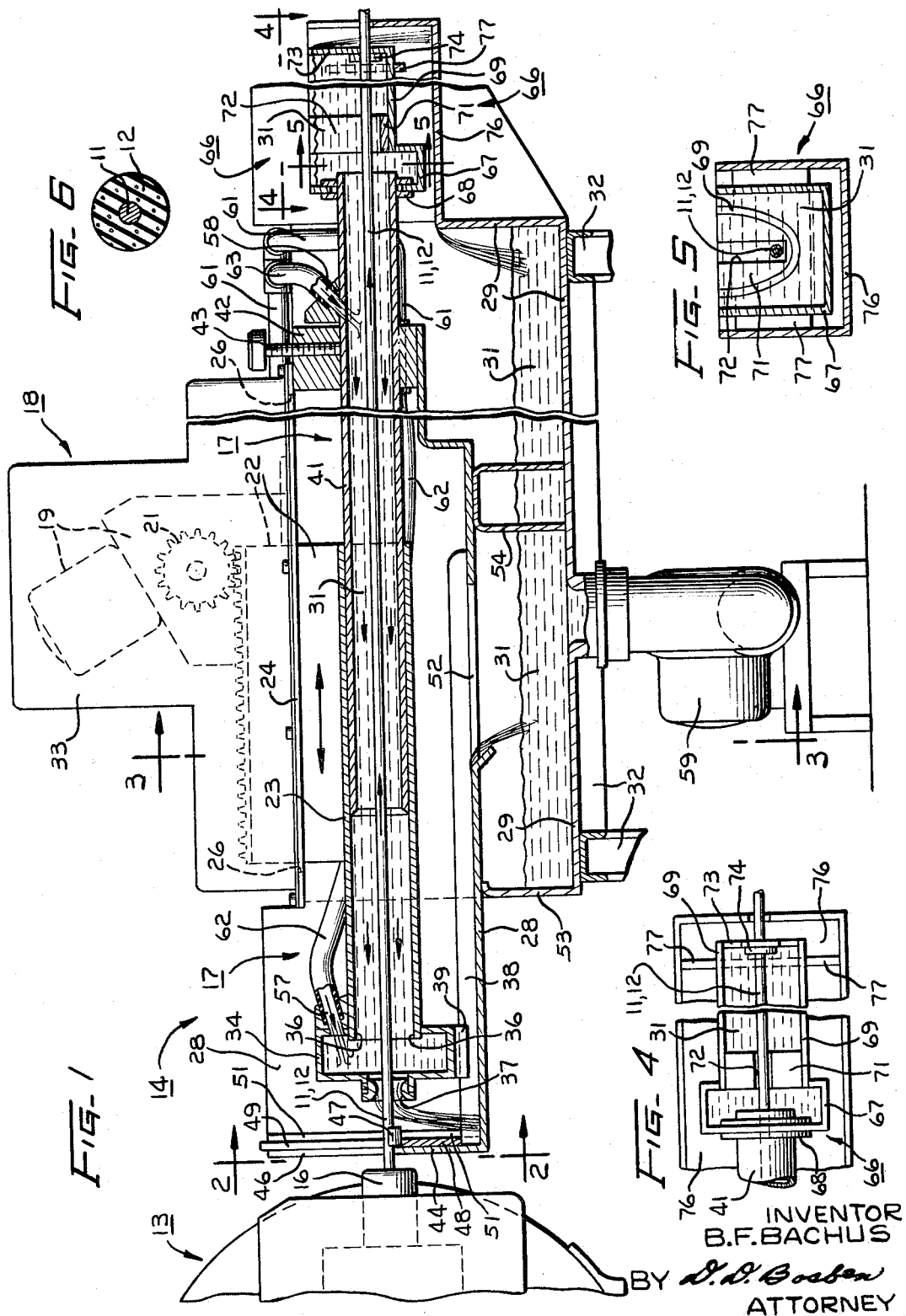

United States Patent Office 3,295,163
Patented Jan. 3, 1967

3,295,163
STRAND COOLING APPARATUS
Benson F. Bachus, Omaha, Nebr., assignor to Western Electric Company, Incorporated, New York, N.Y., a corporation of New York
Filed Apr. 28, 1964, Ser. No. 363,136
5 Claims. (Cl. 18—12)

This invention relates to strand cooling apparatus, and more particularly to apparatus for cooling a longitudinally moving strand. It is an object of this invention to provide new and improved apparatus of this character.

In the manufacture of an electrical conductor wire having expanded plastic insulation, it is standard practice to advance the wire from an extrusion die, in which the plastic is extruded onto the wire, through the atmosphere to a water cooling trough. As the wire enters the cooling trough the plastic, which has been expanding so that a multitude of small discrete cells or air voids are being formed therein, is substantially reduced in temperature by the cooling water and its expansion is substantially arrested, with the resultant insulation on the electrical conductor wire being of a cellular construction.

The cellular construction of the insulation makes electrical conductor wires insulated in this manner extremely useful for communication purposes, particularly as components of communication cable, providing the insulation possesses certain desirable characteritics, as for example, such that the capacitance of the insulated wire is substantially uniform along its length. In this regard, the cellular construction of the insulation must be uniform in nature, that is, the number and size of the air voids in the insulation must be uniform along the length of the wire, and the insulation also must have a uniform outside diameter.

Heretofore, in attempts to obtain an insulated electrical conductor wire having uniform capacitance along its length, one or more mechanisms have been provided for monitoring the capacitance of the wire after the insulation has been cooled in the water trough, and certain phases of the insulating process which affect the capacitance of the wire have been controlled in response to respective ones of these monitors. For example, the position of the entrance end of the water cooling trough with respect to the exit end of the extrusion die has been varied in response to such a monitor, to vary the time of expansion of the extruded insulation betwen the exit end of the extrusion die and the entrance to the cooling trough thereby providing a control over the capacitance of the insulated wire.

However, prior known cooling troughs have not proven satisfactory for producing insulated wire of uniform capacitance because as the advancing insulated wire enters the cooling trough it tends to suck air into the trough causing the formation of air bubbles on the surface of the insulation which prevent the cooling water from engaging and properly cooling the insulation evenly. Similarly, as the insulated wire proceeds through the cooling trough additional air bubbles on the surface of the insulation tend to form as a result of air voids within the cooling water adjacent the insulation. Further, these air voids also cause uneven cooling of the insulation, the net result being a wire in which the cellular structure and the outside diameter of the insulation are not uniform, and in which the capacitance of the wire varies along its length.

Accordingly, another object of this invention is to provide new and improved apparatus for cooling and arresting the expansion of cellular insulation after the extrusion of the insulation onto a longitudinally moving electrical conductor wire by an extruder.

A further object of this invention is to provide new and improved apparatus for cooling and arresting the expansion of cellular insulation after the extrusion of the insulation onto a longitudinally moving electrical conductor wire by an extruder, in which the cooling and arresting of the expansion of the insulation is uniform in nature.

A still further object of this invention is to provide new and improved apparatus for cooling a longitudinally moving strand uniformly.

Another object of this invention is to provide new and improved apparatus for cooling a longitudinally moving strand with a cooling liquid in which air voids in the liquid which cause uneven cooling of the strand are reduced to a minimum.

A further object of this invention is to provide new and improved apparatus for cooling a longitudinally moving strand with a cooling liquid in which the formation of air bubbles on the surface of the strand which prevent the cooling liquid from engaging and cooling the strand evenly are reduced to a minimum.

In accordance with the invention, apparatus for cooling a longitudinally moving strand includes a substantially enclosed container through which the longitudinally moving strand is advanced. During the advancement of the strand through the container a cooling liquid is continuously introduced into the container so as to create a constant and relatively high hydraulic pressure therein, the hydraulic pressure being of a magnitude such that the container constantly is filled with the cooling liquid and free of air, and such that the cooling liquid flows out of a strand entrance aperture in the container to prevent air from being sucked into the container by the longitudinally advancing strand.

In a preferred embodiment of the invention for cooling and arresting the expansion of cellular insulation which has been extruded onto a longitudinally moving electrical conductor wire by an extruder, the insulated wire is advanced from the extruder into a first portion of a substantially enclosed container, the first portion having a relatively enlarged internal cross-section and having a wire entrance aperture substantially larger than the diameter of the insulated wire. Subsequently the wire proceeds through a second portion of the container having a relatively reduced internal cross-section. At least the first container portion is movable toward and away from the extruder to control the expansion of the insulation and thus the capacitance of the insulated wire.

As the insulated wire proceeds through the container, cooling liquid is continuously introduced into the first and second container portions so as to reduce the formation of air voids in the cooling liquid and of air bubbles on the insulation to a minimum. More specifically, the cooling liquid is introduced into the second container portion adjacent a wire exit end thereof so that the liquid flows through the second container portion counter to the movement of the wire, and the hydraulic pressure in the container is maintained at a constant and relatively high magnitude such that the container constantly is filled with the cooling liquid, and such that the cooling liquid flows slowly out of the wire entrance aperture in the first container portion to prevent air from being sucked into the container by the advancing wire. In this latter respect, the construction and arrangement of the first container portion, including its internally enlarged construction and the enlarged wire entrance aperture therein, is such as to prevent the cooling liquid from flowing out of the wire entrance aperture at high velocity and substantially parallel to the wire onto the extruder and/or the surrounding area. Further, an assembly is provided at the wire exit end of the second container portion for preventing any substantial flow of the cooling liquid out of the container through the wire exit end, whereby air voids would be produced in the container.

This invention, together with further objects and advantages thereof, will best be understood by reference to the following detailed description taken in connection with the accompanying drawings in which:

FIG. 1 is an elevational view of the apparatus in longitudinal cross-section;

FIG. 2 is an enlarged partial end view of the apparatus as seen substantially along the line 2—2 of FIG. 1;

FIG. 3 is an enlarged cross-sectional view of the apparatus taken substantially along the line 3—3 of FIG. 1;

FIG. 4 is a partial plan view of the apparatus as seen substantially along the line 4—4 of FIG. 1;

FIG. 5 is a cross-sectional view of the apparatus taken substantially along the line 5—5 of FIG. 1; and FIG. 6 is a cross-sectional view of an electrical conductor wire having cellular plastic insulation.

Referring to FIG. 6 of the drawings, it is seen that the illustrated embodiment of the invention relates to the manufacture of electrical conductor wire 11 of the type having a plastic insulating cover 12 of a cellular construction, that is, having a plurality of small discrete cells or air voids therein. In the illustrated embodiment of the invention, the wire 11 is advanced by a mechanism (not shown) longitudinally to the right, as viewed in FIG. 1, from an extrusion apparatus 13 and then through cooling apparatus 14 of this invention, the extrusion apparatus preferably being of the type described in my copending application Serial No. 312,098, filed September 27, 1963 and assigned to the same assignee.

More specifically, referring to FIG. 1, it is seen that as the wire 11 travels through the extrusion apparatus 13, it passes through an extruding die 16 in which plastic material is extruded about the wire. The wire 11 then passes through the atmosphere a short distance, during which time the plastic which has been extruded thereon is expanding, and then into an elongated water cooling container or tube assembly 17 of the water cooling apparatus 14, in which tube assembly the extruded plastic is cooled quickly by being quenched in a water bath in a manner to be described, to harden the plastic about the wire and to arrest its expansion. As is described in my above-mentioned copending application Serial No. 312,098, the position of the wire entrance end of the cooling tube assembly 17 with respect to the exit end of the extruding die 16, which position affects the capacitance of the wire 11 in that it determines the degree to which the plastic can expand before its expansion is arrested by the water in the tube assembly, is controlled by a capacitance monitor (not shown) located beyond the cooling apparatus 14 with respect to the direction of advancement of the wire 11, that is, to the right of the cooling apparatus as viewed in FIG. 1. Associated with the capacitance monitor for this purpose, as is best shown at the top of FIGS. 1 and 3, is a drive mechanism 18 including a reversing type motor 19 having a toothed gear 21 mounted on a drive shaft thereof. The gear 21 is engaged with a toothed rack 22 welded to the top of a longitudinally movable tubular member 23 of the cooling tube assembly 17, for driving the tubular member toward and away from the extruding die 16 in response to capacitance error signals from the capacitance monitor to the motor 19.

Referring to FIGS. 1 and 3, it is seen that the reversing motor 19 is mounted on a horizontally extending plate member 24 provided with an elongated guide slot 26 for the toothed rack 22, the guide slot receiving the rack in close fitting relationship and extending longitudinally parallel to the path of movement of the wire 11 through the cooling tube assembly 17. The mounting plate 24 is supported in part on spaced brackets 27, one of which is shown in FIG. 3, having vertical sides thereof welded to a vertical side wall of a substantially rectangular shaped cooling water return trough 28, and is slidably supported at its left-hand side (FIG. 3) on the top of a vertical side wall of a reservoir 29 containing cooling water 31 and resting on a support table 32. A protective cover 33 for the motor 19, the gear 21 and the toothed rack 22 is secured to the mounting plate 24 by suitable screws.

As is best shown in FIG. 1, the left-hand end of the movable tubular member 23 of the cooling tube assembly 17 has an annular member 34 welded or otherwise suitably secured thereto. The interior of the annular member 34 is relatively enlarged with respect to an otherwise open end 36 of the movable tubular member 23, and the annular member includes a wire entrance aperture 37 which is substantially larger in diameter than the diameter of the insulated wire 11, for reasons subsequently to be described. The bottom of the annular member 34 is supported and guided by an elongated rib 38 and has a downwardly curved semicircular member 39 (FIGS. 1 and 3) welded thereto and in complemental engagement with an upwardly curved surface portion of the guide rib 38 for this purpose. The guide rib 38 is welded or otherwise suitable secured to a bottom wall of the water return trough 28 and, as in the case of the guide slot 26 for the toothed rack 22, extends longitudinally parallel to the path of movement of the wire 11.

Referring to FIGS. 1 and 3, it is seen that the movable tubular member 23 of the cooling tube assembly 17 is mounted for telescoping movement on a second tubular member 41 of the cooling tube assembly. The second tubular member 41, adjacent its right-hand (FIG. 1) or wire exit end, is adjustably mounted for longitudinal movement in a collar member 42 forming a vertical end wall of the water return trough 28, so that the effective cooling length of the cooling tube assembly 17 can be varied as desired. During an extruding and cooling operation the second tubular member 41 is clamped in a desired position with respect to the trough 28 by a vertical lock screw 43 which is screw threaded through the collar member 42 so as to be engageable with the top of the second tubular member.

Referring to the left-hand side of FIG. 1 and to FIG. 2, it is seen that a vertical end wall 44 of the water return trough 28 is provided with a V-shaped wire entrance slot 46 and that an upwardly facing semicircular water deflecting member 47 is provided adjacent the apex of the slot in spaced relationship with respect to the insulation 12 so as not to come in contact therewith, for shielding the insulation from water splash caused by the cooling water 31 flowing into the trough from the wire entrance aperture 37 in the annular member 34, and for preventing the water from splashing out of the trough through the V-shaped slot. The left-hand end (FIG. 1) of the water deflecting member 47 is welded to a vertically extending plate member 48 adjacent the apex of a wire receiving V-shaped slot 49 in the plate, and the plate member is removably positioned in vertically extending slots adjacent the opposite sides of the water return trough 28, the slots being formed by side portions of the vertical end wall 44 and vertically extending guide members 51 welded to interior side wall surfaces of the trough and projecting into the interior of the trough in spaced relationship with respect to the end wall.

As is shown in FIGS. 1 and 3, the bottom wall of the water return trough 28 has an opening 52 therein through which the cooling water 31 from the wire entrance aperture 37 discharges from the trough back into the reservoir 29. The bottom wall of the trough 28 also is slidably supported on the top of a vertical end wall portion 53 of the reservoir 29 and upon an inverted channel-shaped member 54 located in the interior of the reservoir and welded or otherwise suitably secured to the top surface of its bottom wall. Thus, the trough 28, and the cooling tube assembly 17 and the drive mechanism 18, both of which are carried by the trough, are movable manually or by a suitable mechanism horizontally to the left in FIG. 1 into the position shown in that figure so that the wire entrance end of the trough and the wire entrance aperture 37 of the cooling tube assembly are closely adjacent the extruding die 16 for an extruding and cooling operation, and are movable to the right into a position spaced from the extruding die and the remainder of the extrusion apparatus 13, as for example, for the purpose of changing the extruding die or for performing maintenance on the extrusion apparatus. As is best shown in FIG. 3, the trough 28 may be clamped in a desired position with respect to the reservoir 29 and the extrusion apparatus 13 by means of a clamping nut and bolt assembly 56, the bolt of which extends through a horizontally extending slot in a second vertical side wall of the reservoir 29 and an aperture in an adjacent vertical side wall of the trough.

As is best shown in FIG. 1, the cooling water 31 in the reservoir 29 is introduced into the cooling tube assembly 17 at a preselected cooling temperature through a nozzle 57 on the internally enlarged annular member 34 and a nozzle 58 on the fixed tubular member 41 adjacent its wire exit end. For this purpose, in the illustrated embodiment of the invention a centrifugal pump 59 has its inlet connected to the reservoir 29 and its outlet connected for pumping the cooling water 31 through a suitable heat exchanger 60 (FIG. 3) into a piping system 61, the piping system including flexible conduits 62 and 63 (FIG. 1) connected to the nozzles 57 and 58, respectively, to permit the above-mentioned longitudinal movement of the tubular members 23 and 41. Variations in the temperature of the cooling water 31, which affect the rate at which the insulation 12 on the wire 11 is cooled and the rate at which the expansion of the insulation is arrested, and which thus affects the capacitance of the completed wire, are compensated for by the movement of the movable tubular member 23 and the annular member 34 toward and away from the extruding die 16 as above described.

A pressure reducing control valve 64 (left-hand side of FIG. 3) of a suitable adjustable type, such as model 11–009 manufactured by the C. A. Norgren Company of Englewood, Colorado, is including in the piping system 61 between the pump 59 and the nozzles 57 and 58 for maintaining the hydraulic pressure within the cooling tube assembly 17 at a constant and a relatively high magnitude such that the cooling tube assembly always is filled with the cooling water 31 and free of air, and such that the cooling water always flows out of the wire entrance aperture 37 in the annular member 34 relatively slowly. By maintaining the cooling tube assembly 17 filled with the cooling water 31 and free of air the formation of air voids in the cooling water in the tube assembly, and thus of air bubbles on the insulation 12, both of which conditions cause uneven cooling of the insulation and a completed wire 11 of nonuniform capacitance and outside diameter, are substantially reduced. In this regard, air bubbles on the insulation 12 prevent the cooling water 31 in the cooling tube assembly 17 from engaging the insulation, while air voids in the cooling water create a condition in which the cooling water may not always be in engagement with the insulation as the wire 11 proceeds through the cooling tube assembly. Similarly, the forcing of the cooling water 31 out of the wire entrance aperture 37 reduces the tendency for air to be sucked into the cooling tube assembly 17 by the advancing wire 11, thus reducing the formation of air bubbles on the insulation 12 as the wire 11 enters the tube assembly, as well as the formation of air voids in the cooling water in the cooling tube assembly and air bubbles on the insulation as the wire subsequently proceeds through the tube assembly.

The diameter of the wire entrance aperture 37 is considerably larger than the outer diameter of the insulation 12 on the wire 11, as shown in FIG. 1, so that the hydraulic pressure in the cooling tube assembly 17 can be maintained at a relatively high magnitude, as above-described, without the cooling water 31 flowing out of the aperture at high velocity, this being undesirable for various reasons. For example, the water 31 would tend to spray or splatter onto the extrusion apparatus 13 and/or the surrounding area, thus creating maintenance and housekeeping problems. Similarly, the water 31 would tend to spray or splatter on the insulation 12 on the wire 11 between the extruding die 16 and the wire entrance aperture 37, and/or to run along the insulation toward the extruding die 16, causing uneven cooling of the insulation. In this regard, for the insulation 12 to be cooled evenly and for its expansion to be arrested uniformly, the initial contact between the cooling water 31 and the insulation always should be at the same point relative to the wire entrance aperture 37 and as nearly circumferential with respect to the insulation as possible.

As is best shown in FIG. 1, the tendency for air bubbles to form on the surface of the insulation 12 as the wire 11 is advanced through the cooling tube assembly 17 is further reduced as a result of the nozzle 58 adjacent the wire exit end of the fixed tubular member 41 being arranged at an angle to the path of movement of the wire such that the cooling water 31 entering the cooling tube assembly through the nozzle flows through the cooling tube assembly toward its wire entrance end in a direction counter to the movement of the wire. This flow of the cooling water 31 counter to the movement of the wire 11 tends to reduce the formation of air bubbles on the insulation 12 by counteracting the tendency for the advancing wire to suck air which may accumulate in the cooling tube assembly 17, to the surface of the insulation. Further, the water flow counter to the movement of the advancing wire 11 tends to "scour" the surface of the insulation 12 to remove any air bubbles which may form thereon.

The interior of the movable tubular member 23 opening into the relatively enlarged interior of the annular member 34 and the introduction of the cooling water 31 into the annular member 34 through the nozzle 57 provide an arrangement in which the velocity of the cooling water 31 flowing from the nozzle 58 is substantially arrested as it approaches and/or enters the annular member, so that this water does not flow directly through the annular member and out of the wire entrance aperture 37 therein at high velocity, for the reasons set forth hereinabove. Further, it has been found that this arrangement also helps promote more uniform cooling of the insulation 12 in that it tends to reduce turbulence in the cooling water 31 in the annular member 34 and to produce a condition in which the cooling water flows with a smooth swirling movement adjacent the wire entrance aperture 37, whereby the formation of air voids in the water in this area and the formation of air bubbles on the surface of the insulation, are substantially reduced.

Referring to the right-hand side of FIG. 1, it is seen that the nozzle 58 is spaced from the wire exit end of the fixed tubular member 41 so that the cooling water 31 being introduced into the tubular member through the nozzle does not flow directly out of the wire exit end of the tubular member, instead of counter to the movement of the wire 11 as above described. Further, the wire exit end of the fixed tubular member 41 has a trough assembly 66 attached thereto, the purpose of the trough assembly being to prevent any substantial flow of the cooling water 31 out of the wire exit end of the tubular member.

The trough assembly 66, as is best shown in FIGS. 1 and 4, includes an enlarged box-like compartment 67 removably mounted on the wire exit end of the fixed tubular member 41 by means of a suitable flexible waterproof connection 68, and as is best shown in FIGS. 1, 4 and 5, also includes an elongated U-shaped compartment or trough 69 having its left-hand end (FIGS. 1 and 4) suitably secured to the box-like compartment 67, as by welding. Fixedly mounted in the U-shaped trough 69 at its left-hand end (FIGS. 1 and 4) is a block member 71 provided with a vertical slot 72 through which the wire 11 travels in passing from the box-like compartment 67 to the U-shaped trough, the slot extending parallel to the direction of travel of the wire for a relatively substantial distance (FIGS. 1 and 4) and being of a width only slightly greater than the insulation 12 (FIGS. 4 and 5). At the right-hand end (FIGS. 1 and 4) of the U-shaped trough 69 a vertical end wall 73 thereof is provided with an apertured seal 74 through which the wire 11 travels as it exits from the trough.

During an extruding and cooling operation the box-like compartment 67, the U-shaped through 69 and the slot 72 in the block member 71 remain substantially filled with the cooling water 31, as is illustrated in FIGS. 1, 4 and 5, with the water in the U-shaped though, as a result of the pumping action of the wire 11, flowing slowly over the end wall 73 into a second water return trough 76 which is integral with the reservoir 29. Thus, the cooling water 31 in the box-like compartment 67 tends to act as a liquid seal to retain the cooling water 31 in the fixed tubular member 41 of the cooling tube assembly 17 and to prevent the cooling water from being pumped out of the cooling tube assembly by the advancing wire 11, whereby air voids would be produced in the cooling tube assembly. Similarly, the block member 71, including the closely adjacent opposed walls thereof defining the relatively narrow and elongated slot 72, and the cooling water 31 in the U-shaped trough 69, reduce the tendency for the advancing wire 11 to pump the cooling water 31 from the box-like compartment 67 into the U-shaped trough.

The U-shaped trough 69 is supported for sliding movement in U-shaped slots in a plurality of support members 77 (only one shown) so that the box-like compartment 67 and the trough move with the first water return trough 28, the cooling tube assembly 17 and the drive mechanism 18 as this structure is moved toward and away from the extrusion apparatus 13 as above described, the flexible connection 68 permitting the U-shaped trough and the box-like compartment to be supported substantially entirely by the support members 77 during this movement instead of becoming cantilevered on the wire exit end of the fixed tubular member 41 of the cooling tube assembly. The support members 77 have opposite ends thereof welded or otherwise suitably secured to vertical side walls of the second water return trough 76.

As is shown in the drawings, in order to keep the cooling water pumping action of the advancing wire 11 in the cooling tube assembly 17 to a minimum and thus to keep the cooling tube assembly filled with the cooling water 31 and free of air, the internal diameters of the movable tubular member 23 and the fixed tubular member 41 should be considerably greater than the external diameter of the insulation 12. Similarly, as shown in the drawings and as noted hereinabove, in order that the pumping action of the advancing wire 11 adjacent the wire entrance aperture 37 will not be such that the cooling water 31 will not flow out of the wire entrance aperture as shown in FIG. 1, the diameter of the wire entrance aperture should be considerably greater than the external diameter of the insulation 12. For example, in manufacturing wire 11 having insulation 12 with an external diameter of six hundredths of an inch, favorable results have been achieved using a movable tubular member 23 having an internal diameter on the order of 1½ inches, a fixed tubular member 41 having an internal diameter on the order of 1¼ inches, and a wire entrance aperture 37 having a diameter on the order of ¾ of an inch. For other size wires, of course, it may be necessary or desirable to vary these diameters.

The magnitude of the hydraulic pressure necessary in the cooling tube assembly 17 to maintain the assembly full of the cooling water 31 and free of air, and to keep the cooling water flowing slowly out of the wire entrance aperture 37, varies considerably with the insulating line speed of the wire 11. By way of illustration, in manufacturing insulated wire 11 with apparatus as set forth in the preceding paragraph, while favorable results have been achieved at an insulating line speed of 1000 feet per minute with the control valve 64 set at 5 p.s.i.g., for an insulating line speed of 2700 feet per minute it has been found necessary to increase the setting of the control valve 64 to a constant value in the range of 15–20 p.s.i.g.

In preparing for an extruding and cooling operation, the cooling tube assembly 17, the drive mechanism 18, the water return trough 28 and the trough assembly 66 are moved relative to the reservoir 29 into the position shown in FIG. 1 and the trough 28 is clamped to the reservoir by the bolt and nut assembly 56 (FIG. 3). Then, as the insulated wire 11 is advanced through the cooling tube assembly 17, the cooling water 31 is pumped from the reservoir 29 by the centrifugal pump 59 through the heat exchanger 60 into the piping system 61, including the flexible conduits 62 and 63 and the pressure reducing valve 64, and ultimately through the nozzles 57 and 58 into the cooling tube assembly. During the extruding and cooling operation the movable tubular member 23 and the internally enlarged annular member 34 thereon are moved toward and away from the extruding die 16 by the drive mechanism 18 in response to error signals from the above-mentioned capacitance monitor (not shown) to control the capacitance of the completed insulated wire 11.

As the wire 11 travels through the cooling tube assembly 17 from the extrusion apparatus 13 the formation of air voids in the cooling water 31 in the tube assembly and the formation of air bubbles on the insulation 12, which as noted hereinabove causes non-uniform cooling of the insulation and thus a completed insulated wire 11 of non-uniform capacitance and external diameter, are kept to minimum. This is accomplihed (1) by setting the control valve 64 so that the hydraulic pressure in the cooling tube assembly 17 is maintained at a constant and a relatively high value by the pump 59 such that the cooling tube assembly constantly is filled with the cooling water 31 and free of air, and such that the cooling water flows out of the wire entrance aperture 37 at a relatively slow velocity about the entire periphery of the insulation 12 to prevent air from being sucked into the cooling tube assembly by the advancing wire 11; (2) as a result of the cooling water 31 from the nozzle 58 flowing through the cooling tube assembly 17 counter to the longitudinal movement of the wire 11 to counteract the tendency for the wire to suck air, which may accumulate in the cooling tube assembly, to the surface of the insulation 12, and to "scour" the surface of the insulation to remove air bubbles which may form thereon; (3) as a result of the internally enlarged construction of the annular member 34 and the introduction of the cooling water 31 into the annualr member through the nozzle 57, which arrangement reduces turbulence in the annular member and produces a condition in which the cooling water flows with a smooth swirling movement adjacent the wire entrance aperture 37; and (4) by the trough assembly 66 which reduces the tendency for the advancing wire 11 to pump the cooling water 31 out of the wire exit end of the cooling tube assembly 17.

As the cooling water 31 flowing through the cooling tube assembly 17 from adjacent its wire exit and approaches and/or enters the internally enlarged annular member 34, the velocity of the water is substantially arrested as a result of the internally enlarged construction of the member and by the cooling water 31 which is being introduced into the member through the nozzle 57. Thus, the cooling water 31 flowing from the exit end of the cooling tube assembly 17 does not flow directly through the annular member 34 and out of the wire entrance aperture 37 therein at high velocity, which is undesirable for the reasons discussed hereinabove. Similarly, even though the hydraulic pressure in the cooling tube assembly 17 is relatively high, the cooling water 31 still flows out of the wire entrance aperture relatively slowly because of the wire entrance aperture 37 being substantially larger than the outer diameter of the insulation 12 on the wire 11. Further, since the hydraulic pressure in the cooling tube assembly 17 is constant the flow of the water 31 out of the wire entrance aperture 37 is substantially uniform so that its initial engagement with the insulation 12 on the wire 11 is always at substantially the same point with respect to the wire entrance aperture and substantially circumferential with respect to the insulation.

The cooling water 31 flowing out of the wire entrance aperture 37 falls into the water return trough 28 (FIG. 1) so that the trough end wall 44, the deflector member 47 and the removable plate member 48 are effective to retain the water in the trough and to prevent the water from splattering onto the extrusion apparatus 13 and/or the surrounding area. Subsequently, the water 31 flows along the bottom of the water return trough 28 through the opening 52 and into the reservoir 29 for recirculation, while the water 31 in the U-shaped trough 69 at the wire exit end of the apparatus 14 flows slowly over the trough end wall 73 into the second water return trough 76 and into the reservoir 29.

While one embodiment of the invention has been disclosed, many modifications will be apparent and it is intended that the invention be interpreted as including all modifications which fall within the true spirit and scope of the invention.

What is claimed is:

1. Apparatus for applying a coating to a longitudinally advancing strand, which comprises:
   means for applying coating material to the longitudinally advancing strand in a relatively hot condition;
   a substantially enclosed, elongated container through which the longitudinally moving coated strand is advanced along the longitudinal axis of said container from said coating material applying means, said container having a strand exit aperture therein, and having a strand entrance aperture therein which is spaced from said coating material applying means and which is substantially larger in cross section than the coated strand;
   means for continuously introducing a cooling liquid, for cooling the coating material, into said container at a constant hydraulic pressure of a higher magnitude than the air pressure adjacent the strand entrance aperture in said container, such that said container constantly is filled with the cooling liquid and free of air, and such that the cooling liquid continuously flows out of the strand entrance aperture in said container to prevent air from being sucked into said container by the longitudinally advancing coated strand, with the initial contact of the coated strand with the cooling liquid being along a line which extends substantially peripherally of the coated strand;
   a nozzle through which the cooling liquid is introduced into said container adjacent the strand exit aperture therein in a direction counter to the longitudinal movement of the coated strand; and
   means for preventing any substantial flow of the cooling liquid out of said container through the strand exit aperture in said container.

2. Apparatus for applying a coating to a longitudinally advancing strand as recited in claim 1, and further including a nozzle adjacent the strand entrance aperture in said container for introducing cooling liquid into said container so as to reduce the velocity of the cooling liquid flowing from said first-mentioned nozzle, so that the liquid does not flow out of the strand entrance aperture in said container at high velocity and substantially parallel to the coated strand.

3. Apparatus for cooling a longitudinally moving strand, which comprises:
   a substantially enclosed first container portion having an aperture therein through which the strand enters said container portion in spaced relationship with respect to the entire periphery of the aperture;
   a substantially enclosed elongated second container portion into which the longitudinally moving strand passes from said first container portion and through which the strand passes with the entire periphery of the strand in spaced relationship with respect to the interior of said second container portion, the interiors of said first and second container portions being in direct communication with one another through a connecting opening and the interior of said first container portion being enlarged with respect to the opening and with respect to the strand entrance aperture in said first container portion in a direction extending transversely with respect to the path of movement of the strand through said first and second container portions;
   a nozzle through which cooling liquid is introduced into the interior of said elongated second container portion adjacent a strand exit end thereof such that the cooling liquid flows toward said enlarged first container portion in a direction counter to the longitudinal movement of the strand, said enlarged first container portion tending to reduce the velocity of the cooling liquid flowing from said nozzle so that the liquid does not flow out of the strand entrance aperture in said first container portion at high velocity and substantially parallel to the strand;
   means including said nozzle for continuously introducing cooling liquid into said container portions at a constant and relatively high hydraulic pressure of a magnitude such that said container portions constantly are filled with the cooling liquid and free of air, and such that the cooling liquid flows out of the enlarged strand entrance aperture in said first container portion at a relatively slow velocity about the entire periphery of the strand to prevent air from being sucked into said container portions by the advancing strand; and
   means for preventing any substantial flow of the cooling liquid out of the strand exit end of said second container portion.

4. Apparatus for cooling a longitudinally moving strand as recited in claim 3, which further comprises a nozzle on said internally enlarged first container portion through which cooling liquid is introduced into said first container portion.

5. In combination with an extruder for extruding cellular insulation onto a longitudinally moving electrical conductor wire, apparatus located beyond the extruder with respect to the direction of advancement of the wire for cooling the insulation and arresting the expansion thereof, which comprises:
   a substantially enclosed first container portion having an aperture therein through which the insulated wire enters said container portion from the extruder in spaced relationship with respect to the entire periphery of the aperture;
   a substantially enclosed elongated second container portion into which the longitudinally moving insulated wire passes from said first container portion and through which the insulated wire passes with the entire periphery of the insulation in spaced relationship with respect to the interior of said second container portion, the interiors of said first and second container portions being in direct communication with one another through a connecting opening and the interior of said first container portion being enlarged with respect to the opening and with respect to the wire entrance aperture in said first container portion in a direction extending transversely with respect to the path of movement of the wire through said first and second container portions;

a first nozzle through which cooling liquid is introduced into the interior of said first container portion;

a second nozzle through which cooling liquid is introduced into the interior of said elongated second container portion adjacent a wire exit end thereof such that the cooling liquid flows toward said internally enlarged first container portion in a direction counter to the longitudinal movement of the wire, said internally enlarged first container portion and the cooling liquid being introduced into said first container portion tending to reduce the velocity of the cooling liquid flowing from said second nozzle so that the liquid does not flow out of the wire entrance aperture in said first container portion at high velocity and substantially parallel to the wire;

means, including valve control means, for continuously introducing the cooling liquid into said container portions through said nozzles at a constant and relatively high hydraulic pressure of a magnitude such that said container portions constantly are filled with the cooling liquid and free of air, and such that the cooling liquid flows out of the enlarged wire entrance aperture in said first container portion at a relatively slow velocity about the entire periphery of the insulation on the wire to prevent air from being sucked into said first and second container portions by the advancing wire; and means for preventing any substantial flow of the cooling liquid out of the wire exit end of said elongated second container portion.

References Cited by the Examiner

UNITED STATES PATENTS

| | | | |
|---|---|---|---|
| 2,069,087 | 1/1937 | Forstrom et al. | 18—6 |
| 2,433,094 | 12/1947 | Crowley | 18—6 |
| 2,446,620 | 8/1948 | Swallow et al. | 18—6 |
| 2,561,820 | 6/1951 | Ramsey et al. | 18—6 X |
| 2,765,441 | 10/1956 | Gambrill | 18—6 X |
| 2,837,764 | 6/1958 | Hallam et al. | 18—6 |

FOREIGN PATENTS 564,324    9/1944    Great Britain.

WILLIAM J. STEPHENSON, *Primary Examiner.*